United States Patent
Xue et al.

(10) Patent No.: US 12,413,830 B2
(45) Date of Patent: Sep. 9, 2025

(54) OPTIMIZING INSERTION POINTS FOR CONTENT BASED ON AUDIO AND VIDEO CHARACTERISTICS

(71) Applicants: DISNEY ENTERPRISES, INC., Burbank, CA (US); BEIJING HULU SOFTWARE TECHNOLOGY DEVELOPMENT CO., LTD, Beijing (CN)

(72) Inventors: Yuanyi Xue, Alameda, CA (US); Michael John Bracco, Raleigh, NC (US); Scott Christopher Labrozzi, Cary, NC (US); Christopher Richard Schroers, Uster (CH); Wenhao Zhang, Beijing (CN)

(73) Assignees: Disney Enterprises, Inc., Burbank, CA (US); BEIJING YOJAJA SOFTWARE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/041,794

(22) PCT Filed: Dec. 13, 2022

(86) PCT No.: PCT/CN2022/138617
§ 371 (c)(1),
(2) Date: Feb. 15, 2023

(87) PCT Pub. No.: WO2024/124394
PCT Pub. Date: Jun. 20, 2024

(65) Prior Publication Data
US 2025/0080797 A1 Mar. 6, 2025

(51) Int. Cl.
H04N 21/845 (2011.01)
H04N 21/439 (2011.01)
(Continued)

(52) U.S. Cl.
CPC ..... *H04N 21/8455* (2013.01); *H04N 21/4394* (2013.01); *H04N 21/44008* (2013.01); *H04N 21/44016* (2013.01); *H04N 21/4662* (2013.01)

(58) Field of Classification Search
CPC ......... H04N 21/44016; H04N 21/4394; H04N 21/4662; H04N 21/8455
See application file for complete search history.

(56) References Cited

U.S. PATENT DOCUMENTS 9,838,730 B1 * 12/2017 Matias ............... H04N 21/4302
11,336,930 B1 * 5/2022 Gupta ................. G06V 20/635
(Continued)

FOREIGN PATENT DOCUMENTS

| CN | 108282684 A | 7/2018 |
| EP | 2 398 239 A1 | 12/2011 |
| WO | WO 2009/000204 A1 | 12/2008 |

OTHER PUBLICATIONS

International Telecommunication Union, "Series P: Telephone Transmission Quality, Telephone Installations, Local Line Networks", Audiovisual quality in multimedia services, https://videoclarity.com/PDF/T-REC-P.910-199909-IPDF-E1.pdf, Sep. 29, 2022, 37 pages.
(Continued)

*Primary Examiner* — Thai Q Tran
*Assistant Examiner* — Jose M Mesa
(74) *Attorney, Agent, or Firm* — Farjami & Farjami LLP

(57) ABSTRACT

One embodiment of the present invention sets forth a technique for inserting content into a media program. The technique includes determining a plurality of markers corresponding to a plurality of locations within a media program. The technique also includes for each marker included in the plurality of markers, automatically analyzing a first set of intervals within the media program that lead up to the marker and a second set of intervals within the media program that immediately follow the marker and determine
(Continued)

a set of audio characteristics associated with the first set of intervals and the second set of intervals. The technique further includes generating a plurality of scores for the plurality of markers based on the set of audio characteristics for each marker and inserting additional content at one or more markers included in the plurality of markers based on the plurality of scores.

20 Claims, 5 Drawing Sheets

(51) Int. Cl.
*H04N 21/44* (2011.01)
*H04N 21/466* (2011.01)

(56) References Cited

U.S. PATENT DOCUMENTS

| | | |
|---|---|---|
| 2014/0115625 A1 | 4/2014 | McCoy et al. |
| 2018/0084291 A1 | 3/2018 | Wei et al. |
| 2019/0090020 A1* | 3/2019 | Srivastava ............. G11B 27/28 |

OTHER PUBLICATIONS

Grosche et al., "Cyclic Tempogram—A Mid-Level Tempo Representation for Musicsignals", https://citeseerx.ist.psu.edu/viewdoc/download?doi=10.1.1.400.1218&rep=rep1&type=pdf, Sep. 29, 2022, 4 pages.
International Search Report & Written Opinion dated Aug. 17, 2023 for International Application PCT/CN2022/138617.

* cited by examiner

| Marker ID (302) | Rank (246) | Dispersion Score (304) | Luminance Score (306) | S/T Score (308) | Spectrum Correlation Score (292) | Loudness Score (310) | Speech Score (312) | Semantics Score (314) | Marker Treatment (242) |
|---|---|---|---|---|---|---|---|---|---|
| 4 | 1 | 0 | 0 | 0 | 0 | 1 | 0 | 0 | S/F |
| 0 | 2 | 1 | 1 | 1 | 2 | 1 | 0 | 0 | F/F |
| 3 | 3 | 1 | 1 | 1 | 1 | 2 | 1 | 0 | F/F |
| 1 | 3 | 2 | 2 | 3 | 1 | 0 | 0 | 0 | F/F |
| 2 | 5 | 2 | 0 | 3 | 1 | 3 | 2 | 1 | F/F |

FIG. 3

OPTIMIZING INSERTION POINTS FOR CONTENT BASED ON AUDIO AND VIDEO CHARACTERISTICS

CROSS-REFERENCE TO RELATED APPLICATION

This application is a U.S. National Stage Patent Application of the International Patent Application titled, "OPTIMIZING INSERTION POINTS FOR CONTENT BASED ON AUDIO AND VIDEO CHARACTERISTICS," filed Dec. 13, 2022, and having Serial No. PCT/CN2022/138617. The subject matter of this related application is hereby incorporated herein by reference.

BACKGROUND

Field of the Various Embodiments

Embodiments of the present disclosure relate generally to computer science and inserting content into media programs and, more specifically, to optimizing insertion points for content based on audio or video characteristics.

Description of the Related Art

Movies, television shows, user-generated videos, radio shows, podcasts, or other types of media programs are frequently aired or played with commercial breaks that occur at various "insertion points" included in the media programs. The insertion points include "black slugs," or sequences of black video frames, that are inserted between shots or scenes within a given media program. The insertion points also can include, or instead include, markers that identify specific video frames as locations of scene changes, chapter breaks, or other types of "transitions" within a given media program.

Typically, the number of potential insertion points in a media program is greater than the number of commercial breaks in the same media program. Thus, a subset of potential insertion points can be selected as actual insertion points for content. When an insertion point is reached during playback or airing of a media program, the content associated with the insertion point (e.g., a commercial) is played back or aired instead of the content associated with the media program. Once the content associated with the insertion point has been fully played back or aired, playback or airing of the content associated with the media program resumes.

One drawback of inserting content, such as commercials, at designated insertion points within a media program is that the inserted content can negatively impact the overall viewing experience of a viewer. For example, a commercial that is inserted into the middle of an action scene in a movie could disrupt the coherence and continuity of the action scene for viewers of the movie. In another example, a commercial break could have a jarring or disruptive effect on viewers when the light or loudness levels of the associated commercial do not match the light or loudness levels associated with the location in the media program at which the commercial is inserted.

To mitigate unpleasant viewing experiences associated with inserting commercials at designated insertion points, a content insertion specialist can manually review audio or video content occurring before and after each potential insertion point in a media program and identify a subset of potential insertion points that are appropriate locations for commercial breaks, rate or score each potential insertion point as suitable or unsuitable for a commercial break, or provide other feedback that can be used to evaluate the suitability of different insertion points for different types of content. However, the process of manually reviewing and curating insertion points leads to inconsistent or unpredictable results, as each reviewer uses largely subjective criteria to determine whether or not a given insertion point is an appropriate location for a commercial break. Additionally, each reviewer considers a limited number of factors when reviewing the audio or content around a potential insertion point for compatibility with commercials or other types of content to be inserted. Consequently, commercial breaks can occur at suboptimal locations within media programs even when these locations are carefully considered and selected. Further, the time and resources required to manually review content and identify insertion points for commercial breaks can be infeasible for time-sensitive content such as live productions.

As the foregoing illustrates, what is needed in the art are more effective techniques for inserting content into media programs.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 3 illustrates an exemplar set of data generated by the scoring engine of FIG. 1, according to various embodiments.

DETAILED DESCRIPTION

In the following description, numerous specific details are set forth to provide a more thorough understanding of the various embodiments. However, it will be apparent to one of skill in the art that the inventive concepts may be practiced without one or more of these specific details.

System Overview

Figure 1:
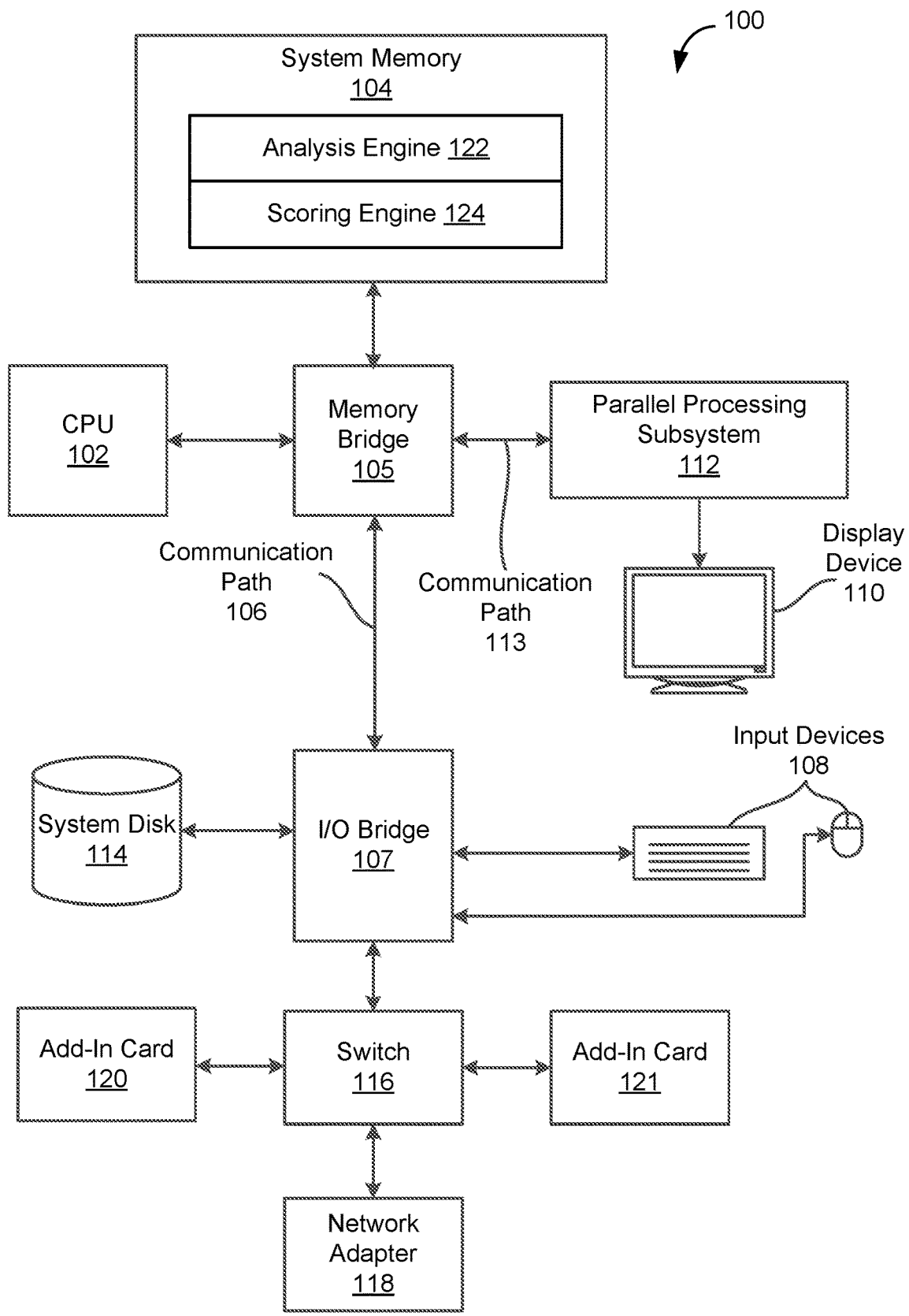
FIG. 1 is a block diagram illustrating a computer system configured to implement one or more aspects of various embodiments.

FIG. 1 is a block diagram illustrating a computer system 100 configured to implement one or more aspects of various embodiments. In one embodiment, computer system 100 includes a desktop computer, a laptop computer, a smart phone, a personal digital assistant (PDA), tablet computer, or any other type of computing device configured to receive input, process data, and optionally display images, and is suitable for practicing one or more embodiments. Computer system 100 also, or instead, includes a machine or processing node operating in a data center, cluster, or cloud computing environment that provides scalable computing resources (optionally as a service) over a network.

As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

I/O bridge 107 is configured to receive user input information from optional input devices 108, such as a keyboard or a mouse, and forward the input information to CPU 102 for processing via communication path 106 and memory bridge 105. In some embodiments, computer system 100 may be a server machine in a cloud computing environment. In such embodiments, computer system 100 may not have input devices 108. Instead, computer system 100 may receive equivalent input information by receiving commands in the form of messages transmitted over a network and received via the network adapter 118. In one embodiment, switch 116 is configured to provide connections between I/O bridge 107 and other components of the computer system 100, such as a network adapter 118 and various add-in cards 120 and 121.

In one embodiment, I/O bridge 107 is coupled to a system disk 114 that may be configured to store content and applications and data for use by CPU 102 and parallel processing subsystem 112. In one embodiment, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. In various embodiments, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 includes a graphics subsystem that delivers pixels to an optional display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. Such circuitry may be incorporated across one or more parallel processing units (PPUs), also referred to herein as parallel processors, included within parallel processing subsystem 112. In other embodiments, the parallel processing subsystem 112 incorporates circuitry optimized for general purpose or compute processing. Again, such circuitry may be incorporated across one or more PPUs included within parallel processing subsystem 112 that are configured to perform such general purpose or compute operations. In yet other embodiments, the one or more PPUs included within parallel processing subsystem 112 may be configured to perform graphics processing, general purpose processing, and compute processing operations. System memory 104 includes at least one device driver configured to manage the processing operations of the one or more PPUs within parallel processing subsystem 112.

Parallel processing subsystem 112 may be integrated with one or more of the other elements of FIG. 1 to form a single system. For example, parallel processing subsystem 112 may be integrated with CPU 102 and other connection circuitry on a single chip to form a system on chip (SoC).

In one embodiment, CPU 102 is the master processor of computer system 100, controlling and coordinating operations of other system components. In one embodiment, CPU 102 issues commands that control the operation of PPUs. In some embodiments, communication path 113 is a PCI Express link, in which dedicated lanes are allocated to each PPU, as is known in the art. Other communication paths may also be used. PPU advantageously implements a highly parallel processing architecture. A PPU may be provided with any amount of local parallel processing memory (PP memory).

It will be appreciated that the system shown herein is illustrative and that variations and modifications are possible. First, the functionality of the system can be distributed across multiple nodes of a distributed or cloud computing system. Second, the connection topology, including the number and arrangement of bridges, the number of CPUs 102, and the number of parallel processing subsystems 112, can be modified as desired. For example, in some embodiments, system memory 104 could be connected to CPU 102 directly rather than through memory bridge 105, and other devices would communicate with system memory 104 via memory bridge 105 and CPU 102. In another example, parallel processing subsystem 112 may be connected to I/O bridge 107 or directly to CPU 102, rather than to memory bridge 105. In a third example, I/O bridge 107 and memory bridge 105 may be integrated into a single chip instead of existing as one or more discrete devices. Third one or more components shown in FIG. 1 may not be present. For example, switch 116 could be eliminated, and network adapter 118 and add-in cards 120, 121 would connect directly to I/O bridge 107.

In one or more embodiments, computer system 100 is configured to execute an analysis engine 122 and a scoring engine 124 that reside in system memory 104. Analysis engine 122 and scoring engine 124 may be stored in system disk 114 or other storage and loaded into system memory 104 when executed.

More specifically, analysis engine 122 and scoring engine 124 include functionality to optimize the insertion of commercials or other types of content into movies, television shows, podcasts, radio programs, user-generated content, live broadcasts, or other types of media programs that include audio or video content. Analysis engine 122 assesses the audio or video characteristics of a given media program in proximity to markers that represent potential locations at which the content can be inserted. For example, analysis engine 122 could determine video characteristics related to scene dispersion, luminance, spatial/temporal activity, or semantic characteristics in one or more intervals of video around each marker. In another example, analysis engine 122 could determine audio characteristics related to loudness levels, detected speech, longer-arc semantics, or spectrum correlation in one or more intervals of audio around each marker. In a third example, analysis engine 122 could determine both video characteristics and audio characteristics associated with one or more intervals of video and audio content around each marker.

Scoring engine 124 converts the audio or video characteristics determined by analysis engine 122 into one or more scores that represent the suitability of a given marker as a location in the media program at which content can be inserted. For example, scoring engine 124 could convert individual audio or video characteristics associated with a given marker into numeric scores or "categories" associated with the audio or video characteristics. Scoring engine 124 could also aggregate the characteristics or corresponding scores or categories into an overall score and select one or more markers with overall scores that indicate the highest suitability for insertion of content as insertion points for commercials or other content. Scoring engine 124 could also, or instead, determine one or more marker treatments to be applied to the video or audio around the marker to provide greater continuity during transitions between the media program and content inserted at the marker. Analysis engine 122 and scoring engine 124 are described in further detail below with respect to FIGS. 2A-2C.

Figure 2A:
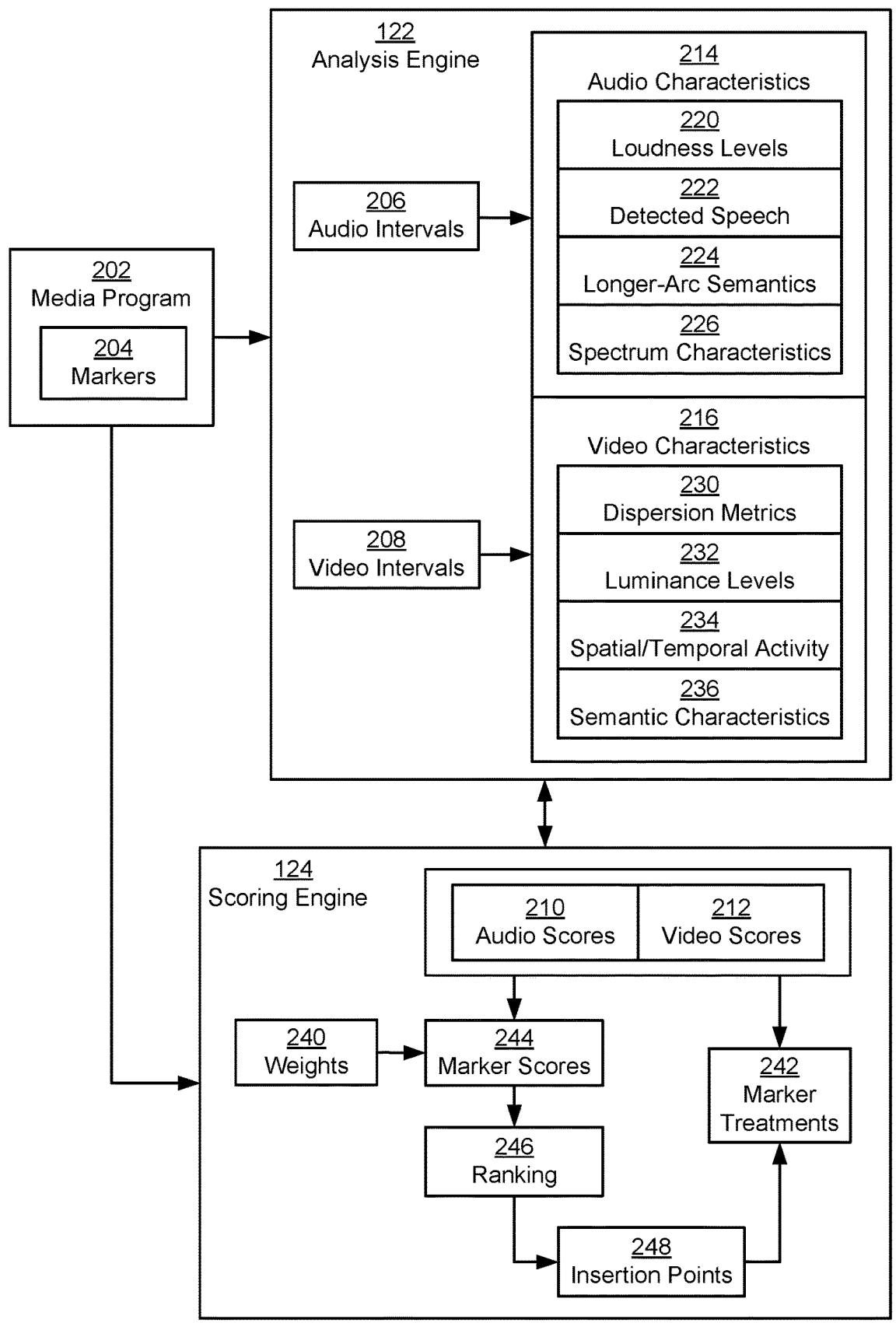
FIG. 2A is a more detailed illustration of the analysis engine and scoring engine of FIG. 1, according to various embodiments.

Optimizing Insertion Points for Content Based on Audio and Video Characteristics FIG. 2A is a more detailed illustration of analysis engine 122 and scoring engine 124 of FIG. 1, according to various embodiments. As mentioned above, analysis engine 122 and scoring engine 124 perform analysis related to the insertion of commercials or other types of content at a number of insertion points 248 in a media program 202.

As shown in FIG. 2A, media program 202 includes or is associated with a set of markers 204 that denote the potential locations at which additional content can be inserted. For example, markers 204 could be identified in metadata associated with media program 202. Each of markers 204 could include a video frame, timestamp, or another point in time that corresponds to a scene change, chapter break, black slug inserted between scenes, or another "transition" in content within media program 202. Each of markers 204 could also, or instead, be identified or selected by one or more users or according to one or more rules or heuristics (e.g., every Nth frame in media program 202 is denoted as a marker, a scene change in media program 202 is denoted as a marker if the scene change is at least a certain number of minutes after the previous marker, etc.). Some or all markers 204 could also, or instead, be randomly selected from video frames, timestamps, or other representations of locations in media program 202.

In some embodiments, some or all markers 204 are specified in a Composition Playlist that adheres to the Society of Motion Picture and Television Engineers (SMPTE) ST-2067.3 specification. The Composition Playlist includes information related to the composition of media program 202. Within the Composition Playlist, markers 204 corresponding to black slugs inserted between scenes are specified using pairs of First Frame of Commercial Blacks (FFCB) and Last Frame of Commercial Blacks (LFCB) labels. Markers 204 corresponding to potential insertion points that lack black slugs (e.g., scene changes, chapter breaks, user-selected frames, randomly selected frames, frames that match rules or heuristics for content insertion, etc.) can be specified using Fixed Point Candidate Insertion (FPCI) labels.

Analysis engine 122 determines a number of audio characteristics 214 associated with one or more audio intervals 206 in proximity to each of markers 204. Analysis engine 122 also, or instead, determines a number of video characteristics 216 associated with one or more video intervals 208 in proximity to each of markers 204.

In some embodiments, each of audio intervals 206 and each of video intervals 208 corresponds to a "window" of time in the vicinity of a marker. For example, each audio or video interval could include a certain number of seconds or minutes of audio or video content leading up to the marker in media program 202. Each audio or video interval could also, or instead, include a certain number of seconds or minutes of audio or video content occurring immediately after the marker in media program 202. In another example, a given audio or video interval could be divided in half by the corresponding marker, so that the amount of time in the interval before the marker is equal to the amount of time in the interval after the marker. A given audio or video interval could alternatively include more (or less) time before the marker than after the marker. In a third example, an audio or video interval could include a time period that is close to a corresponding marker but that does not include the marker (e.g., a three-second period that begins five seconds before the marker and ends two seconds before the marker).

Audio characteristics 214 include loudness levels 220, detected speech 222, longer-arc semantics 224, and spectrum characteristics 226 associated with various audio intervals 206 of audio content in media program 202. Loudness levels 220 include measurements of audio volume before and after a given marker in media program 202. For example, loudness levels 220 could include a first average loudness level for a first audio interval spanning a number of seconds before the marker and a second average loudness level for a second audio interval spanning a number of seconds after the marker. One or both loudness levels could be measured in decibels.

Detected speech 222 includes the presence or absence of speech in one or more audio intervals 206 around a marker. For example, analysis engine 122 could use a voice activity detection (VAD) technique or model to determine whether or not speech is detected within a certain amount of time before or after a marker.

Longer-arc semantics 224 include characteristics related to semantic coherence or continuity across a marker. For example, if an audio interval around the marker includes detected speech 222 before and after the marker, longer-arc semantics 224 could include analysis of speech activity within a longer audio interval around the marker (e.g., more than five seconds before and after the marker location). This analysis could be performed using natural language processing (NLP) techniques that determine whether the speech activity before and after the marker belongs to the same phrase, sentence, or line. In another example, longer-arc semantics 224 could include analyses related to the continuation of music, animal sounds, singing, or other types of sound across a marker.

Spectrum characteristics 226 include sound spectrum features that are determined for audio intervals 206 before and after a marker. For example, the sound spectrum features could be derived from a first audio waveform for an audio interval occurring before the marker and from a second audio waveform for an audio interval occurring after the marker. The sound spectrum features could be analyzed, compared, or correlated to determine whether audio that starts before the marker "bleeds" across the marker and ends after the marker. Spectrum characteristics 226 are described in further detail below with respect to FIG. 2B.

Video characteristics 216 include scene change dispersion statistics 230, luminance levels 232, spatial/temporal activity 234, and semantic characteristics 236 associated with various video intervals 208 of video content in media program 202. Scene change dispersion statistics 230 include measurements of statistical dispersion in scene changes occurring around a given marker. For example, scene change dispersion statistics 230 could include an average "distance" (e.g., number of frames, length of time, etc.) between scene changes that fall within a video interval (e.g., a certain number of seconds or minutes) around the marker. Scene change dispersion statistics 230 could also, or instead, include a variance of distances between the scene changes within the video interval. The average distance would correspond to a measure of the frequency of scene changes around the marker, with a higher frequency of scene changes represented by a lower average distance and a lower frequency of scene changes represented by a higher average distance. The variance of distances between scene changes would correspond to a measure of the amount by which periods between scene changes fluctuate. A higher variance of distances represents a greater fluctuation in the lengths of scenes (e.g., both short and long scenes) around the marker, and a lower variance of distances represents a more "uniform" cadence (e.g., scenes that are closer to one another in length) in scene changes around the marker.

Luminance levels 232 include measurements of luminance before and after a given marker in media program 202. For example, luminance levels 232 could include a first average luminance for a first video interval spanning a number of seconds before the marker and a second average luminance for a second video interval spanning a number of seconds after the marker. Each average luminance could be computed as the average pixel value within the corresponding video interval. Each average luminance could also be normalized to fall within a range of 0 to 1, where 0 corresponds to a black pixel and 1 corresponds to the highest possible luminance in media program 202. A normalized value that is closer to 0 thus represents lower luminance within the corresponding video interval, and a normalized value that is closer to 1 represents higher luminance within the corresponding video interval.

Spatial/temporal activity 234 includes metrics related to spatial details or temporal changes in one or more video intervals 208 around a given marker. For example, spatial/temporal activity 234 could include spatial perceptual information (SI) and temporal perceptual information (TI) metrics that are computed for video frames that fall within a video interval around the marker. These SI and TI metrics could be computed according to techniques described in ITU-T Recommendation P.910. More specifically, an SI metric for a sequence of video frames within the video interval would be computed by applying a Sobel filter to each video frame, computing the standard deviation over the pixels in each Sobel-filtered video frame, and setting the SI metric to the largest standard deviation computed for an individual video frame in the sequence. The TI metric for a sequence of video frames within the video interval would be computed by computing the difference between pixel values at the same pixel locations for pairs of successive video frames, computing the standard deviation of each difference in pixel values, and setting the TI metric to the largest standard deviation computed for a pair of successive video frames in the sequence.

Semantic characteristics 236 include attributes related to semantics conveyed in one or more video intervals 208 of content around a given marker. For example, semantic characteristics 236 could include tags that specify attributes related to the production of the content, such as (but not limited to) producers, companies, studios, directors, cast, sponsors, copyrights, or ratings. These tags could also, or instead, include genres (e.g., movie, television show, live action, animated, scripted, unscripted, competition, etc.), categories, episodes, series, or keywords that describe the context of the content. These tags could also, or instead, include objects or entities detected in the content, such as (but not limited to) characters, actors, locations, trees, cars, animals, humans, types of objects, or commercial brands. These tags could also, or instead, include scenarios related to the content, such as (but not limited to) travel, hiking, indoor, or cooking. These tags could also, or instead, include sentiments, moods, facial expressions, actions, or emotions found in the content around the marker.

In some embodiments, semantic characteristics 236 are extracted from metadata that is embedded within or provided with media program 202. Some or all semantic characteristics 236 can also, or instead, be generated by inputting media program 202 into machine learning models, video analysis and understanding modules, semantic segmentation modules, action recognition modules, or other components for extracting or identifying semantic information in audio or video content.

After analysis engine 122 has computed audio characteristics 214 and video characteristics 216 for one or more markers 204 in media program 202, scoring engine 124 computes a set of audio scores 210 associated with audio characteristics 214 or a set of video scores 212 associated with video characteristics 216. Each of audio scores 210 and each of video scores 212 indicates the extent to which the corresponding audio characteristics 214 and video characteristics 216, respectively, are suitable for the insertion of commercials or other content at the corresponding markers 204. For example, each of audio scores 210 and each of video scores 212 for a given marker could include a numeric score that rates or categorizes the corresponding audio characteristic or video characteristic in terms of compatibility with inserting content at the marker. A lower score could indicate a greater compatibility with the insertion of content at the marker, and a higher score could indicate a lower compatibility with the insertion of content at the marker.

In one or more embodiments, scoring engine 124 computes different audio scores 210 for loudness levels 220, detected speech 222, longer-arc semantics 224, and spectrum characteristics 226. Scoring engine 124 similarly computes different video scores 212 for scene change dispersion statistics 230, luminance levels 232, spatial/temporal activity 234, and semantic characteristics 236.

More specifically, scoring engine 124 assigns an audio "loudness score" to a marker based on a category to which loudness levels 220 for an audio interval near or around the marker belong. For example, scoring engine 124 could divide loudness levels 220 into discrete ranges corresponding to "silent," "quiet," "normal," and "loud." Scoring engine 124 could also assign loudness scores of 0, 1, 2, and 3 to the "silent," "quiet," "normal," and "loud" categories, respectively.

Scoring engine 124 similarly assigns an audio "speech score" to a marker based on a category to which the corresponding detected speech 222 belongs. For example, detected speech 222 could indicate whether an audio interval around the marker includes speech before or after the marker. When no speech is detected before or after the marker, scoring engine 124 could set the speech score to 0. When speech is detected on one side of the marker (i.e., before or after the marker but not both), scoring engine 124 could set the speech score to 1. When speech is detected on both sides of the marker (i.e., before and after the marker), scoring engine 124 could set the speech score to 2.

Scoring engine 124 converts longer-arc semantics 224 for a marker into an audio "semantics score" indicating whether or not longer-arc semantics 224 interfere with the insertion of content at the marker. For example, scoring engine 124 could assign a semantic score of 0 to the marker when longer-arc semantics 224 indicate that content inserted at the marker would not interrupt a segment of speech or another type of audio that spans both sides of the marker. Conversely, scoring engine 124 could assign a semantic score of 1 to the marker when longer-arc semantics 224 indicate that content inserted at the marker would interrupt a segment of speech or another type of audio that spans both sides of the marker.

Scoring engine 124 converts spectrum characteristics 226 into one or more audio "spectrum correlation scores" indicating the degree of similarity between a first set of spectrum characteristics 226 for one or more audio intervals 206 before a marker and a second set of spectrum characteristics 226 for one or more audio intervals 206 after the marker. Spectrum characteristics 226 that are less similar to one another before and after the marker are assigned a score that indicates greater suitability for insertion of content at the marker, while spectrum characteristics 226 that are more similar to one another before and after the marker are assigned a different score that indicates lower suitability for insertion of content at the marker. Generation of audio spectrum correlation scores from spectrum characteristics 226 derived from audio around a marker is described in further detail below with respect to FIG. 2C.

As mentioned above, scene change dispersion statistics 230 include an average distance between scene changes within a video interval around a marker and a variance of distances between the scene changes within the video interval. Scoring engine 124 converts the average distance and variance into a video "dispersion score" that indicates how compatible scene changes in the vicinity of the marker are to the insertion of content at the marker. For example, scoring engine 124 could determine that scene changes around the marker are compatible with the insertion of content when the average distance between scene changes within the video interval is high (i.e., indicating that scene changes are relatively infrequent) and the variance of distances between scene changes within the video interval is low (i.e., indicating that the scene changes happen at a relatively even cadence). As a result, scoring engine 124 could compare the average distance between scene changes to a minimum threshold (e.g., to ensure that the scene changes are not too frequent) and the variance of distances between scene changes to a maximum threshold (e.g., to ensure that the scene changes are regularly paced). Scoring engine 124 could also set the dispersion score to a numeric value representing the result of applying the threshold(s) to scene change dispersion statistics 230. A dispersion score of 0 could indicate that both scene change dispersion statistics 230 meet the corresponding thresholds (i.e., scene changes around the marker are of a minimum average length and do not vary greatly in length). A dispersion score of 1 could indicate that one of the two scene change dispersion statistics 230 meets the corresponding threshold. A dispersion score of 2 could indicate that neither dispersion metric meets the corresponding threshold.

Scoring engine 124 converts luminance levels 232 for a marker into a video "luminance score" indicating a category associated with luminance levels 232. For example, scoring engine 124 could apply a threshold (e.g., 0.2) to a first average luminance before the marker and second average luminance after the marker. Scoring engine 124 could set the luminance score for the marker to a numeric value representing the result of applying the threshold to both average luminance values. A luminance score of 0 indicates that both average luminance values fall below the threshold, a luminance score of 1 indicates that one of the average luminance values falls below the threshold and the other of the average luminance values meets or exceeds the threshold, and a luminance score of 2 indicates that both average luminance values meet or exceed the threshold.

Scoring engine 124 similarly converts metrics related to spatial/temporal activity 234 around a marker into a video "spatial/temporal score" that indicates a category associated with the metrics. For example, as with luminance levels 232, scoring engine 124 could apply one or more thresholds to SI and TI metrics computed for video frames within a video interval around the marker. Scoring engine 124 could set the spatial/temporal score for the marker to a numeric value indicating the result of applying the threshold(s) to the SI and TI metrics. A spatial/temporal score of 0 would indicate a low SI and a low TI for the video interval (i.e., SI and TI values that do not meet the corresponding thresholds), a spatial/temporal score of 1 would indicate a high SI and a low TI for the video interval (i.e., an SI value that meets or exceeds a corresponding threshold and a TI value that does not meet a corresponding threshold), a spatial/temporal score of 2 would indicate a low SI and a high TI for the video interval (i.e., an SI value that does not meet or exceeds a corresponding threshold and a TI value that meets a corresponding threshold), and a spatial/temporal score of 3 would indicate a high SI and a high TI for the video interval (i.e., an SI value that meets or exceeds a corresponding threshold and a TI value that meets or exceeds a corresponding threshold).

Scoring engine 124 converts semantic characteristics 236 into one or more "semantic characteristics scores" indicating the degree to which semantic characteristics 236 associated with video intervals 208 around markers 204 are compatible with the insertion of content at each marker. For example, scoring engine 124 could use one or more rules, machine learning models, or other techniques to convert semantic characteristics 236 into the semantic characteristics score(s). These techniques could assign a semantic characteristics score that indicates a certain level of compatibility with insertion of content at a marker based on the presence or absence of certain semantic characteristics 236 (e.g., specific characters, objects, locations, sentiments, emotions, etc.) within one or more video intervals 208 around the marker. These techniques could also, or instead, determine a semantic characteristics score that indicates the suitability of a given marker as an insertion point for a specific type of content (e.g., a commercial for a specific brand, product, type of business, etc.), given semantic characteristics 236 associated with video intervals 208 around the marker.

After audio scores 210 and video scores 212 are determined for a set of markers 204, scoring engine 124 combines audio scores 210 and video scores 212 into overall marker scores 244 for the set of markers 204. Each of marker scores 244 represents the overall suitability of a corresponding marker as an insertion point for commercials or other content into media program 202. For example, a higher marker score could indicate a greater suitability of the marker as an insertion point for content, and a lower marker score could indicate a lower suitability of the marker as an insertion point for content.

In some embodiments, scoring engine 124 computes marker scores 244 by applying a set of rules, heuristics, or formulas to audio scores 210 and video scores 212. For example, scoring engine 124 could evaluate a series of rules or conditional statements using audio scores 210 and video scores 212 for a marker and obtain an overall marker score for the marker as a result of the evaluation. Scoring engine 124 could also, or instead, compute the overall marker score as a weighted combination of audio scores 210 and video scores 212. The rules, conditional statements, or weights 240 included in the weighted combination could be provided by one or more human experts or users involved in managing the insertion of content into media programs.

Scoring engine 124 also, or instead, uses one or more machine learning models to convert audio scores 210 and video scores 212 into marker scores 244 for the corresponding markers 204. For example, scoring engine 124 or another component could collect human-generated numeric marker scores 244 for various markers in a training dataset of media programs. Each human-generated marker score could include a user's opinion of the suitability of a corresponding marker as an insertion point for content. The component could input audio scores 210 and video scores 212 for each marker into a neural network, support vector machine, regression model, decision tree, random forest, or another type of machine learning model. The component could also use a training technique (e.g., gradient descent and backpropagation, least squares, chi-square, etc.) and one or more loss functions to update parameters of the machine learning model (e.g., neural network weights 240) in a way that reduces the error between the output generated by the machine learning model from a set of audio scores 210 and video scores 212 for each marker in the training dataset and a corresponding human-generated marker score for the same marker. After training of the machine learning model is complete, scoring engine 124 could input audio scores 210 and video scores 212 for additional markers 204 that are not in the training dataset into the trained machine learning model and obtain marker scores 244 for the additional markers 204 as output of the trained machine learning model.

While the calculation of marker scores 244 has been described above with respect to audio scores 210 and video scores 212, it will be appreciated that scoring engine 124 can compute marker scores 244 from audio characteristics 214 and video characteristics 216, in lieu of or in addition to computing marker scores 244 from the corresponding audio scores 210 and video scores 212. For example, scoring engine 124 could use one or more rules, formulas, or machine learning models to convert numeric or other values representing loudness levels 220, detected speech 222, longer-arc semantics 224, spectrum characteristics 226, scene change dispersion statistics 230, luminance levels 232, spatial/temporal activity 234, or semantic characteristics 236 for a given marker into a marker score for the marker.

After marker scores 244 are computed for all markers 204 in media program 202, scoring engine 124 generates a ranking 246 of markers 204 by marker scores 244. Scoring engine 124 also uses ranking 246 to select one or more markers 204 as insertion points 248 for content.

For example, marker scores 244 that are lower could indicate greater suitability of the corresponding markers 204 as insertion points 248 for content. Scoring engine 124 could rank markers 204 by ascending marker scores 244, so that markers that are determined to be more appropriate for the insertion of content appear closer to the top of ranking 246 and markers that are determined to be less appropriate for the insertion of content appear closer to the bottom of ranking 246. Scoring engine 124 could also use ranking 246 to select a certain number of highest ranked markers 204 or a variable number of markers 204 with marker scores 244 that exceed a numeric, percentile, or another type of threshold as insertion points 248.

Scoring engine 124 additionally determines marker treatments 242 to be applied to markers 204 selected as insertion points 248 (and optionally additional markers 204 in ranking 246). In some embodiments, marker treatments 242 include audio or video effects to be applied to one or more audio intervals 206 or one or more video intervals 208 leading up to or away from a given marker. For example, marker treatments 242 could include a "fade out" effect that is applied to a certain number of seconds of audio or video before a given marker in media program 202 or a "fade in" effect that is applied to a certain number of seconds of audio or video after the marker in media program 202. Marker treatments 242 could also, or instead, include a "slate" effect that involves inserting a number of black frames into media program 202 before or after a given marker. The black frames could be accompanied by a silent audio track to facilitate the transition between content in media program 202 and content inserted at the marker.

As with the calculation of marker scores 244, scoring engine 124 can use a variety of techniques to determine marker treatments 242 for individual markers 204. For example, scoring engine 124 could use a machine learning model to predict marker treatments 242 for a marker, given input that includes audio or video content within one or more intervals around the marker, audio characteristics 214 or video characteristics 216 associated with the audio or video content, or audio scores 210 or video scores 212 associated with the audio or video content. Training data for the machine learning model could include labels corresponding to user-specified marker treatments for various intervals of content around a marker. Scoring engine 124 or another component could input audio scores 210, video scores 212, audio characteristics 214, or video characteristics 216 into a neural network, support vector machine, regression model, decision tree, random forest, or another type of machine learning model. The component could also use a training technique (e.g., gradient descent and backpropagation, least squares, chi-square, etc.) and one or more loss functions to update parameters of the machine learning model (e.g., neural network weights 240) in a way that reduces the error between the output generated by the machine learning model from the input in the training dataset and a corresponding user-specified marker treatment for the same marker. After training of the machine learning model is complete, scoring engine 124 could input additional audio scores 210, video scores 212, audio characteristics 214, or video characteristics 216 for additional markers 204 that are not in the training dataset into the trained machine learning model and obtain marker treatments 242 for the additional markers 204 as output of the trained machine learning model.

In another example, scoring engine 124 could use a set of rules, heuristics, weights 240, or formulas to determine marker treatments 242 for a marker from audio characteristics 214, video characteristics 216, audio scores 210, video scores 212, audio content, or video content associated with one or more intervals around the marker. These rules, heuristics, weights 240, or formulas can be based on editorial decisions or common practices in the entertainment or broadcast industry.

While analysis engine 122 and scoring engine 124 have been described above with respect to evaluating markers 204 based on audio and video in media program 202, it will be appreciated that the functionality of analysis engine 122 and scoring engine 124 can be used with or adapted to other types of content. For example, analysis engine 122 and scoring engine 124 could be used to generate marker scores 244 for a given program that includes only audio content or predominantly focuses on audio content (e.g., a radio program, podcast, concert, audio recording, etc.) based on audio characteristics 214 and audio scores 210. Similarly, analysis engine 122 and scoring engine 124 could be used to generate marker scores 244 for a given program that includes only video content or predominantly focuses on video content (e.g., a silent film, an online video that automatically plays without sound, etc.) based on video characteristics 216 and video scores 212.

Figure 2B:
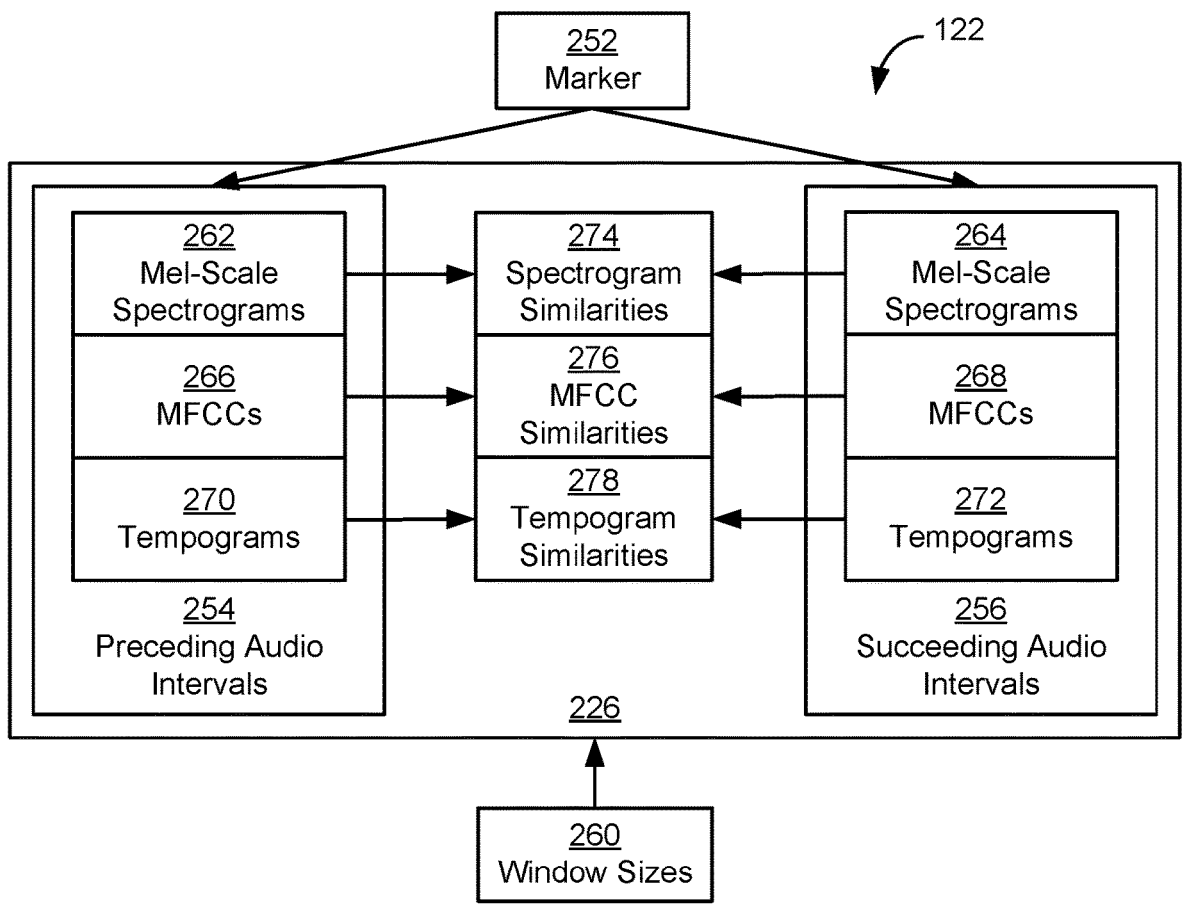
FIG. 2B illustrates the operation of the analysis engine of FIG. 1 in determining spectrum characteristics for a marker in audio content, according to various embodiments.

FIG. 2B illustrates the operation of analysis engine 122 of FIG. 1 in determining spectrum characteristics 226 for a marker 252 in audio content (e.g., media program 202 FIG. 2A), according to various embodiments. As mentioned above, analysis engine 122 determines spectrum characteristics 226 for one or more preceding audio intervals 254 and one or more succeeding audio intervals 256 associated with marker 252.

Preceding audio intervals 254 include intervals of time within the audio content that begin prior to marker 252 and end at marker 252. Succeeding audio intervals 256 include intervals of time within the audio content that begin at marker 252 and end after marker. For example, preceding audio intervals 254 could include a certain number of seconds of audio leading up to marker 252, and succeeding audio intervals 256 could include a certain number of seconds of audio immediately following marker 252.

Within each of preceding audio intervals 254, analysis engine 122 determines spectrum characteristics 226 that include one or more mel-scale spectrograms 262, one or more sets of mel-frequency ceptrum coefficients (MFCCs) 266, and one or more tempograms 270. Similarly, within each of succeeding audio intervals 256, analysis engine 122 determines one or more mel-scale spectrograms 264, one or more sets of MFCCs 268, and one or more tempograms 272.

Analysis engine 122 additionally computes mel-scale spectrograms 262 and 264, MFCC 266 and 268, or tempograms 270 and 272 based on one or more window sizes 260 that are shorter than the corresponding audio intervals. For example, window sizes 260 could be set to tens or hundreds of milliseconds, and each audio interval could be divided into contiguous or overlapping windows of a given window size. A smaller window size allows for increased "resolution" in the detection of changes to spectrum characteristics 226 across windows, and a larger window size allows for "aggregation" of spectrum characteristics 226 over longer time periods.

More specifically, analysis engine 122 computes each mel-scale spectrogram in mel-scale spectrograms 262 and 264 as a series of mel-scale frequency domain representations of the audio within the corresponding audio interval. Within the mel-scale spectrogram, each mel-scale frequency domain representation is computed from a corresponding window that spans a given window size (e.g., in window sizes 260). For example, analysis engine 122 could compute a fast Fourier transform (FFT) for each portion of audio that spans a 20-200 millisecond window within a given audio interval, thereby transforming that portion of audio from the time domain to the frequency domain. Analysis engine 122 could also convert each of the frequency domain representations into the mel scale and lay the mel-scale frequency domain representations side by side along a time axis to form a mel-scale spectrogram for the corresponding audio interval.

Analysis engine 122 also computes MFCCs 266 and 268 for each window into which a given audio interval is divided. Continuing with the above example, analysis engine 122 could take the logarithm of each mel-scale frequency domain representation of a portion of audio spanning a 20-200 millisecond window within a given audio interval. Analysis engine 122 could then derive a set of MFCCs for the window as discrete cosine transform coefficients of the amplitudes of the resulting spectrum.

Analysis engine 122 computes tempograms 270 and 272 as estimates of tempo-based characteristics of audio within the corresponding preceding audio intervals 254 and succeeding audio intervals 256, respectively. For example, analysis engine 122 could compute each tempogram as a "heat map" of confidences associated with a range of tempos across the corresponding audio interval. The tempogram could include a series of probability vectors, with each probability vector representing a corresponding 20-200 millisecond window within the audio interval. Each probability vector would store a set of estimated probabilities of a number of "bucketized" tempos (as defined by a step size of 16-24 Hz) for the corresponding window.

After mel-scale spectrograms 262 and 264, MFCCs 266 and 268, and tempograms 270 and 272 are determined for various audio intervals leading up to and immediately following marker 252 and various windows spanning one or more window sizes 260 within the audio intervals, analysis engine 122 computes one or more spectrogram similarities 274 between mel-scale spectrograms 262 for one or more preceding audio intervals 254 and mel-scale spectrograms 264 for one or more corresponding succeeding audio intervals 256. Analysis engine 122 also computes one or more MFCC similarities 276 between MFCCs 266 for one or more preceding audio intervals 254 and MFCCs 268 for one or more corresponding succeeding audio intervals 256. Analysis engine 122 additionally computes one or more tempogram similarities 278 between tempograms 270 for preceding audio intervals 254 and tempograms 272 for succeeding audio intervals 256.

In one or more embodiments, spectrogram similarities 274, MFCC similarities 276, and tempogram similarities 278 include cross similarities between matrices that store the corresponding mel-scale spectrograms 262 and 264, MFCCs 266 and 268, and tempograms 270 and 272, respectively. For example, analysis engine 122 could obtain mel-scale spectrograms 262 and 264, MFCCs 266 and 268, and tempograms 270 and 272 as matrices that include concatenations of columnar feature vectors. Each feature vector in mel-scale spectrograms 262 and 264 could store a mel-scale frequency domain representation of audio that spans a corresponding window within a given audio interval. Each feature vector in MFCCs 266 and 268 could store a set of discrete cosine transform coefficients associated with the logarithm of a mel-scale frequency domain representation of audio that spans a corresponding window within a given audio interval. Each feature vector in tempograms 270 and 272 could store a set of estimated probabilities of various "bucketized" tempos for audio that spans a corresponding window within a given audio interval. Analysis engine 122 could compute spectrogram similarities 274, MFCC similarities 276, and tempogram similarities 278 as Euclidean distances, Kullback-Leibler (KL) divergences, pairwise cosine distances, or other measures of distances or similarity between pairs of feature vectors, where each pair of feature vectors includes a first feature vector from one matrix representing a set of spectrum characteristics 226 (e.g., one or more mel-scale spectrograms 262, MFCCs 266, or tempograms 270) for a first audio interval preceding marker 252 and a second feature vector from another matrix representing a set of spectrum characteristics 226 (e.g., one or more mel-scale spectrograms 264, MFCCs 268, or tempograms 272) for a second audio interval succeeding marker 252. Each set of spectrogram similarities 274, MFCC similarities 276, and tempogram similarities 278 would thus include a pairwise similarity matrix, with each element in the matrix storing a measure of similarity or distance between a first feature vector for a first window within an audio interval preceding marker 252 and a second feature vector for a second window within an audio interval succeeding marker 252.

Figure 2C:
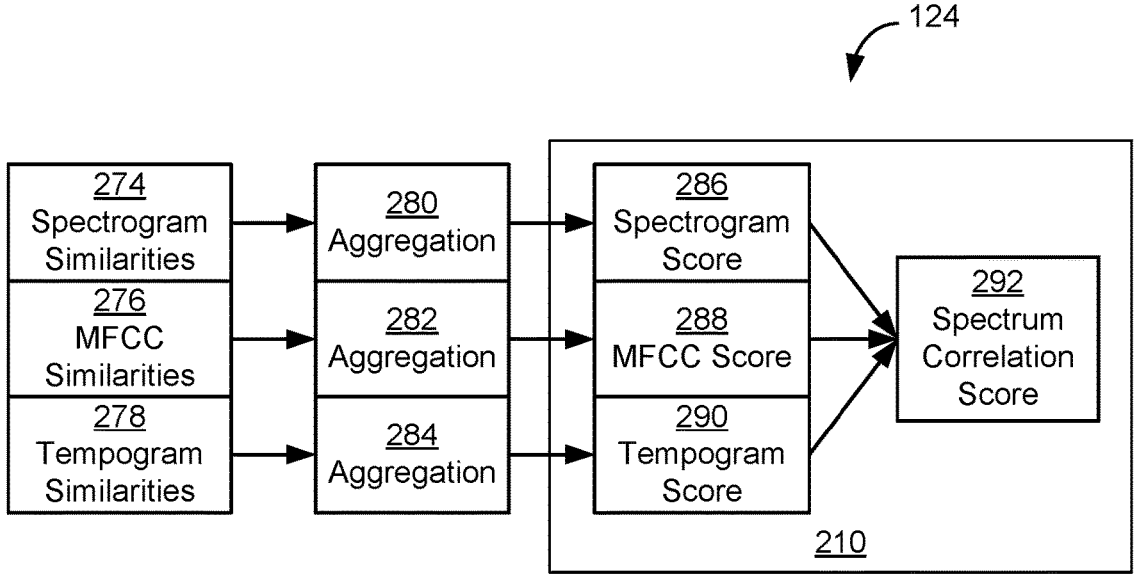
FIG. 2C illustrates the operation of the scoring engine of FIG. 1 in determining audio scores associated with spectrum characteristics for a marker in audio content, according to various embodiments.

FIG. 2C illustrates the operation of scoring engine 124 of FIG. 2A in determining audio scores 210 associated with spectrum characteristics 226 for a marker in audio content, according to various embodiments. As mentioned above, spectrum characteristics 226 include mel-scale spectrograms 262, mel-frequency ceptrum coefficients (MFCCs) 264, and tempograms 270 for one or more preceding audio intervals 254 leading up to the marker (e.g., marker 252) and mel-scale spectrograms 264, MFCCs 268, and tempograms 272 for one or more succeeding audio intervals 256 immediately following the marker. Additionally, spectrogram similarities 274 are computed between mel-scale spectrograms 262 and 264 for pairs of audio intervals that respectively precede and succeed the marker, MFCC similarities 276 are computed between MFCCs 266 and 268 for pairs of audio intervals that respectively precede and succeed the marker, and tempogram similarities 278 are computed between tempograms 270 and 272 for pairs of audio intervals that respectively precede and succeed the marker.

As shown in FIG. 2C, scoring engine 124 applies an aggregation 280 to spectrogram similarities 274 to compute a spectrogram score 286. Scoring engine 124 also applies a second aggregation 282 to MFCC similarities 276 to compute an MFCC score 288. Scoring engine 124 further applies a third aggregation 284 to tempogram similarities 278 to compute a tempogram score 290.

In one or more embodiments, aggregations 280, 282, and 284 include clustering or other analyses of spectrogram similarities 274, MFCC similarities 276, and tempogram similarities 278, respectively. For example, scoring engine 124 could use spectral clustering, k-means clustering, or another clustering technique to reduce the dimensionality associated with each matrix storing spectrogram similarities 274, MFCC similarities 276, and tempogram similarities 278. Scoring engine 124 could also, or instead, use eigenvalues or eigenvectors computed by the clustering technique to determine the rank associated with the matrix.

In some embodiments, scoring engine 124 applies one or more thresholds to the rank associated with a matrix storing spectrogram similarities 274, MFCC similarities 276, or tempogram similarities 278 to generate a corresponding spectrogram score 286, MFCC score 288, or tempogram score 290. More specifically, a matrix with a rank that is a lower percentage of the full rank indicates a higher similarity between a set of spectrum characteristics 226 (e.g., one or more mel-scale spectrograms 262, MFCCs 266, or tempograms 270) determined for one or more preceding audio intervals 254 and a corresponding set of spectrum characteristics 226 (e.g., one or more mel-scale spectrograms 264, MFCCs 268, or tempograms 272) for one or more succeeding audio intervals 256.

Consequently, a matrix with a rank that is below a certain percentage of the full rank can be assigned a score that indicates a higher level of similarity between the set of spectrum characteristics 226 for the preceding audio interval(s) and the set of spectrum characteristics 226 for the succeeding audio interval(s). A rank that meets or exceeds a certain percentage of the full rank can be assigned a score that indicates a lower level of similarity between the set of spectrum characteristics 226 for the preceding audio interval(s) and the set of spectrum characteristics 226 for the succeeding audio interval(s). For example, scoring engine 124 could apply a 10% threshold for high similarity and a 25% threshold for medium similarity to the percentage of the full rank corresponding to the rank of the matrix. When the percentage of the full rank corresponding to the rank of the matrix falls below the 10% threshold for high similarity, scoring engine 124 could generate spectrogram score 286, MFCC score 288, or tempogram score 290 that indicates high similarity between two sets of corresponding spectrum characteristics 226 preceding and succeeding the marker 252. When the percentage of the full rank corresponding to the rank of the matrix falls between the 10% threshold for high similarity and the 25% threshold for medium similarity, scoring engine 124 could generate spectrogram score 286, MFCC score 288, or tempogram score 290 that indicates medium similarity between two sets of corresponding spectrum characteristics 226 preceding and succeeding the marker 252. When the percentage of the full rank corresponding to the rank of the matrix is greater than or equal to the 25% threshold for medium similarity, scoring engine 124 could generate spectrogram score 286, MFCC score 288, or tempogram score 290 that indicates low similarity between two sets of corresponding spectrum characteristics 226 preceding and succeeding the marker 252.

Scoring engine 124 also, or instead, performs aggregations 280, 282, and 284 based on the number of clusters or the sizes of individual clusters generated from the corresponding matrices. For example, scoring engine 124 could apply a maximum threshold to the number of clusters or a minimum threshold to the size of the largest cluster produced via spectral clustering of a matrix that stores pairwise spectrogram similarities 274, MFCC similarities 276, or tempogram similarities 278 between one or more preceding audio intervals 254 and one or more succeeding audio intervals 256. When the number of clusters falls below the maximum threshold or the size of the largest cluster exceeds the minimum threshold, scoring engine 124 could generate spectrogram score 286, MFCC score 288, or tempogram score 290 indicating high similarity between two sets of corresponding spectrum characteristics 226 preceding and succeeding the marker 252. When the number of clusters does not fall below the maximum threshold or the size of the largest cluster does not exceed the minimum threshold, scoring engine 124 could generate spectrogram score 286, MFCC score 288, or tempogram score 290 indicating low similarity between two sets of corresponding spectrum characteristics 226 preceding and succeeding the marker 252.

Aggregations 280, 282, and 284 also, or instead, are performed by one or more machine learning models into which spectrogram similarities 274, MFCC similarities 276, and tempogram similarities 278, respectively, are inputted. For example, scoring engine 124 or another component could collect human-generated indications of numeric spectrogram scores, MFCC scores, or tempogram scores for various markers in a training dataset of media programs (or other types of audio or video content). Each human-generated score could include a user's opinion of the suitability of a corresponding marker as an insertion point for content, given a comparison of one or more mel-scale spectrograms 262, MFCCs 266, or tempograms 270 for audio occurring prior to a marker and one or more mel-scale spectrograms 264, MFCCs 268, or tempograms 272 for audio occurring immediately after the marker. The component could input one or more similarity matrices, sets of eigenvalues, or sets of eigenvectors associated with the mel-scale spectrograms, MFCCs, or tempograms before and after each marker into a neural network, support vector machine, regression model, decision tree, random forest, or another type of machine learning model. The component could also use a training technique (e.g., gradient descent and backpropagation, least squares, chi-square, etc.) and one or more loss functions to update parameters of the machine learning model (e.g., neural network weights 240) in a way that reduces the error between the output generated by the machine learning model for each marker in the training dataset and one or more corresponding human-generated scores for the same marker. After training of the machine learning model is complete, scoring engine 124 could input additional mel-scale spectrograms, MFCCs, or tempograms before and after each marker for additional markers that are not in the training dataset into the trained machine learning model and obtain additional spectrogram scores, MFCC scores, or tempogram scores for the additional markers as output of the trained machine learning model.

Scoring engine 124 can further combine a given spectrogram score 286, MFCC score 288, or tempogram score 290 computed from audio for a preceding audio interval and a corresponding succeeding audio interval associated with a marker into an overall spectrum correlation score 292 for the marker. For example, scoring engine 124 could compute spectrum correlation score 292 as a weighted combination of spectrogram score 286, MFCC score 288, or tempogram score 290. In another example, scoring engine 124 could input spectrogram score 286, MFCC score 288, or tempogram score 290 into a machine learning model and obtain spectrum correlation score 292 as output of the machine learning model.

In general, spectrum correlation score 292 represents the overall similarity between a first set of spectrum characteristics 226 for a given preceding audio interval leading up to a marker and a second set of spectrum characteristics 226 for a corresponding succeeding audio interval immediately following the marker. For example, a lower spectrum correlation score 292 could indicate lower similarity between the two sets of spectrum characteristics 226 and, thus, a greater suitability of the marker as an insertion point for content. Conversely, a higher spectrum correlation score 292 could indicate greater similarity between the two sets of spectrum characteristics 226 and, thus, a lower suitability of the marker as an insertion point for content.

FIG. 3 illustrates an exemplar set of data generated by scoring engine 124 of FIG. 1, according to various embodiments. As shown in FIG. 3, the data is associated with five markers represented by marker identifiers (IDs) 302 of Marker-0, Marker-1, Marker-2, Marker-3, and Marker-4. For example, scoring engine 124 could generate the data for five markers representing chapter breaks, scene changes, black slugs, or other predefined "transition" points in a movie, television show, user-generated video, or another type of media program.

The data includes a ranking 246 of the markers by descending suitability as insertion points for commercials or other additional content. More specifically, the data indicates that the marker associated with a marker ID of Marker-4 has a rank of 1, the marker associated with a marker ID of Marker-0 has a rank of 2, the markers associated with marker IDs of Marker-3 and Marker-1 share the same rank of 3, and the marker associated with a marker ID of Marker-2 has a rank of 5. A higher rank indicates a greater suitability as an insertion point for additional content, and a lower rank indicates a lower suitability as an insertion point for additional content.

The data also includes a number of scores 292 and 304-314 associated with the markers. Scores 304 correspond to dispersion scores that characterize the dispersion in scenes occurring around the markers. More specifically, scores 304 include dispersion scores of 0, 1, 1, 2, and 2 for the marker IDs of Marker-4, Marker-0, Marker-3, Marker-1, and Marker-2, respectively. A dispersion score of 0 indicates that the dispersion in scenes within a certain interval (e.g., a certain number of seconds or minutes) around the marker is compatible with the insertion of additional content at the marker. For example, a dispersion score of 0 could indicate that scene changes around the marker are relatively "dispersed" (i.e., are far apart from one another or the marker), and that the timing of scene changes around the marker is relatively uniform (i.e., scene changes occur at a relatively "fixed" cadence). A dispersion score of 1 indicates that the dispersion in scenes within a certain interval around each marker is somewhat compatible with the insertion of additional content at the marker. For example, a dispersion score of 1 could indicate that scene changes around the marker are relatively dispersed or relatively uniform but not both. A dispersion score of 2 for markers associated with marker IDs of 1 and 2 indicates that the dispersion in scenes within a certain interval around each marker is not compatible with the insertion of additional content at the marker. For example, a dispersion score of 2 could indicate that scene changes around the marker are neither relatively dispersed nor relatively uniform.

Scores 306 correspond to luminance scores that characterize luminance levels in video intervals around the corresponding markers. In particular, scores 306 include luminance scores of 0, 1, 1, 2, and 0 for the marker IDs of Marker-4, Marker-0, Marker-3, Marker-1, and Marker-2, respectively. A luminance score of 0 indicates that the average luminance on both sides of the video interval around the corresponding marker falls below a threshold. A luminance score of 1 indicates that the average luminance on one side of the video interval around the corresponding marker (i.e., before or after the marker but not both) falls below the threshold. A luminance score of 2 indicates that the average luminance on both sides of the video interval around the corresponding marker exceeds the threshold. A lower luminance score corresponds to greater compatibility with the insertion of additional content at the marker, as lower light intensities around the marker improve "leading in" from the media program to the additional content or "leading out" from the additional content back to the media program.

Scores 308 correspond to a set of spatial/temporal (S/T) scores that characterize spatial and temporal activity in video intervals around the corresponding markers. Scores 308 include S/T scores of 0, 1, 1, 3, and 3 for the marker IDs of Marker-4, Marker-0, Marker-3, Marker-1, and Marker-2, respectively. An S/T score of 0 indicates low spatial activity and low temporal activity within the video interval around a corresponding marker, an S/T score of 1 indicates high spatial activity and low temporal activity within the video interval around a corresponding marker, an S/T score of 1 indicates low spatial activity and high temporal activity within the video interval around a corresponding marker, and an S/T score of 3 indicates high spatial activity and high temporal activity within the video interval around a corresponding marker. A lower S/T score corresponds to greater compatibility with the insertion of additional content at the marker, as lower spatial or temporal activity in the vicinity of the marker corresponds to a lower likelihood that the additional content will be inserted in the middle of a "high action" part of the media program.

As mentioned above, each of spectrum correlation scores 292 represents the overall similarity between a first set of spectrum characteristics 226 for a given preceding audio interval leading up to a corresponding marker and a second set of spectrum characteristics 226 for a corresponding succeeding audio interval immediately following the marker. Spectrum correlation scores 292 are set to 0, 2, 1, 1, and 1 for the marker IDs of Marker-4, Marker-0, Marker-3, Marker-1, and Marker-2, respectively. A spectrum correlation score of 0 indicates low similarity between the two sets of spectrum characteristics 226, a spectrum correlation score of 1 indicates medium similarity between the two sets of spectrum characteristics 226, and a spectrum correlation score of 2 indicates high similarity between the two sets of spectrum characteristics 226. A lower spectrum correlation score corresponds to greater compatibility with the insertion of additional content at the marker, as lower similarity between the two sets of spectrum characteristics 226 indicates a higher likelihood of a clean audio break or a lack of foreground audio (e.g., human voices, audio corresponding to action or activity within a scene, etc.) spilling across the marker.

Scores 310 correspond to a set of loudness scores that characterize loudness levels in audio intervals around the corresponding markers. In particular, scores 310 include loudness scores of 1, 1, 2, 0, and 3 for the marker IDs of Marker-4, Marker-0, Marker-3, Marker-1, and Marker-2, respectively. The loudness score for a given marker can be determined by applying one or more thresholds to the average loudness level within an audio interval around the marker. A loudness score of 0 corresponds to a loudness level of "silent," a loudness score of 1 corresponds to a loudness level of "quiet," a loudness score of 2 corresponds to a loudness level of "normal," and a loudness score of 3 corresponds to a loudness level of "loud." A lower loudness score corresponds to greater compatibility with the insertion of additional content at the marker, as lower audio volumes allow for smoother transitions between the media program and the inserted content.

Scores 312 correspond to speech scores that characterize the presence or absence of speech in audio intervals around the corresponding markers. Scores 312 include speech scores of 0, 0, 1, 0, and 2 for the marker IDs of Marker-4, Marker-0, Marker-3, Marker-1, and Marker-2, respectively. A speech score of 0 indicates that no speech was detected within an audio interval around a corresponding marker, a speech score of 1 indicates that speech was detected within the audio interval on one side of the marker (e.g., before or after the marker but not both), and a speech score of 2 indicates that speech was detected within the audio interval on both sides of the marker. A lower speech score corresponds to greater compatibility with the insertion of additional content at the marker, as a lack of speech near a marker reduces the likelihood that the inserted content will interrupt dialogue in the media program.

Scores 314 correspond to semantics scores that characterize longer-arc semantics in audio intervals around the corresponding markers. Scores 314 include semantics scores of 0, 0, 0, 0, and 1 for the marker IDs of Marker-4, Marker-0, Marker-3, Marker-1, and Marker-2, respectively. A semantics score of 0 indicates that content inserted at the marker does not interrupt a segment of speech or another type of audio that spans both sides of the marker. A semantic score of 1 indicates that content inserted at the marker does interrupt a segment of speech or another type of audio that spans both sides of the marker.

The data additionally includes marker treatments 242 to be applied to content before and after the corresponding markers. As shown in FIG. 3, each marker is associated with two marker treatments that are separated by a slash. A first marker treatment is denoted by a first capital letter before the slash, and a second marker treatment is denoted by a second capital letter after the slash. A marker treatment denoted by "S" corresponds to a slate effect, in which black video frames and silent audio are inserted at the corresponding side of the marker. A marker treatment denoted by "F" corresponds to a fade effect, which involves a gradual transition from the media program to black video and silent audio before a marker and a gradual transition from black video and silent audio to the audio visual program after a marker.

Figure 4:
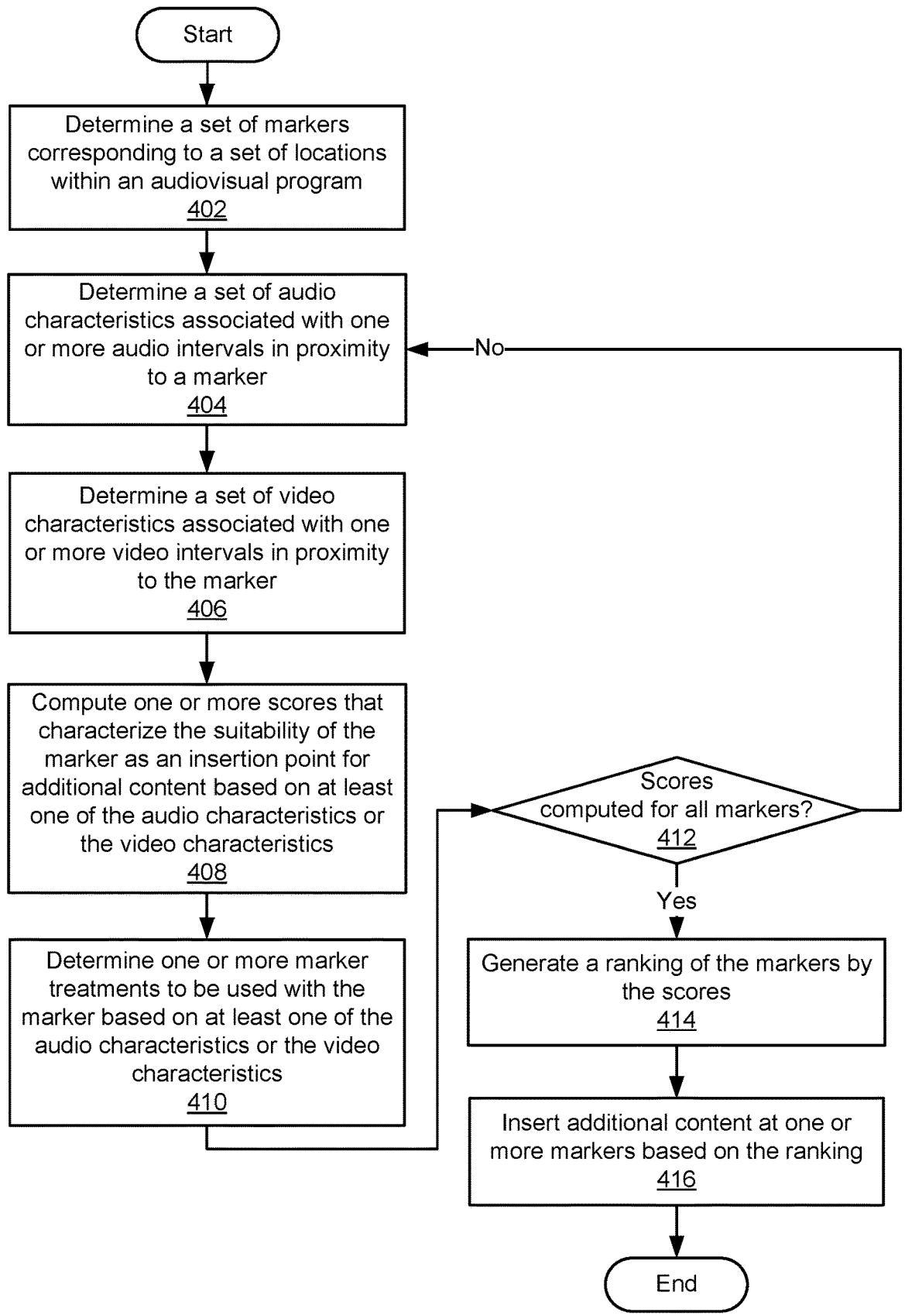
FIG. 4 sets forth a flow diagram of method steps for inserting content into a media program, according to various embodiments.

FIG. 4 sets forth a flow diagram of method steps for inserting content into a media program, according to various embodiments. Although the method steps are described in conjunction with the systems of FIGS. 1-2, persons skilled in the art will understand that any system configured to perform some or all of the method steps in any order falls within the scope of the present disclosure.

As shown, analysis engine 122 determines 402 a set of markers corresponding to a set of locations within the media program. For example, analysis engine 122 could obtain the markers from metadata for the media program or from one or more users. Each marker could include one or more video frames that represent a scene change, a chapter break, or a black slug in the media program. In another example, analysis engine 122 could select every Nth video frame from the media program as a marker. In a third example, analysis engine 122 could randomly select one or more video frames as markers in the media program.

Next, analysis engine 122 determines 404 a set of audio characteristics associated with one or more audio intervals in proximity to a marker. For example, analysis engine 122 could determine loudness levels for a first interval of audio before the marker and a second interval of audio after the marker. Analysis engine 122 could also, or instead, determine whether speech is detected in a first interval of audio before the marker or in a second interval of audio after the marker. Analysis engine 122 could also, or instead, determine longer-arc semantics that indicate whether a line of speech or another type of audio that is semantically coherent spans both sides of the marker. Analysis engine 122 could also, or instead, determine the amount of correlation between a first set of spectrum characteristics (e.g., mel-scale spectrograms, MFCCs, tempograms, etc.) for audio before the marker and a second set of spectrum characteristics for audio after the marker.

Analysis engine 122 also determines 406 a set of video characteristics associated with one or more video intervals in proximity to the marker. For example, analysis engine 122 could determine one or more metrics that characterize the level of dispersion between scenes within an interval of video that spans the marker. Analysis engine 122 could also, or instead, determine average luminance levels for a first interval of video before the marker and a second interval of video after the marker. Analysis engine 122 could also, or instead, determine spatial activity metrics or temporal activity metrics for a first interval of video before the marker and a second interval of video after the marker. Analysis engine 122 could also, or instead, determine semantic characteristics related to characters, actions, facial expressions, emotions, activity, locations, or other visual content in a video within an interval of video that spans the marker.

In general, analysis engine 122 can use audio or intervals of varying lengths to determine the audio characteristics or video characteristics for a given marker. For example, analysis engine 122 could use audio or video intervals of up to a few seconds before and after each marker to determine loudness levels, the presence or absence of speech, spectrum characteristics, luminance levels, or spatial-temporal activity associated with the marker. Analysis engine 122 could use longer audio or video intervals (e.g., several seconds to a number of minutes before or after the marker) to determine longer-arc semantics, scene change dispersion statistics, or semantic characteristics associated with the marker.

Scoring engine 124 computes 408 one or more scores that characterize the suitability of the marker as an insertion point for additional content based on at least one of the audio characteristics or the video characteristics. For example, scoring engine 124 could convert individual audio characteristics or video characteristics into individual scores that represent "categories" of compatibility with inserting content at the marker. Scoring engine 124 could also use a set of rules, one or more formulas, or one or more machine learning models to aggregate the individual scores, audio characteristics, or video characteristics into an overall marker score for the marker. The overall marker score could represent an overall suitability of the marker as an insertion point for additional content.

Scoring engine 124 additionally determines 410 one or more marker treatments to be used with the marker based on at least one of the audio characteristics or the video characteristics. For example, scoring engine 124 could use a set of rules, one or more formulas, or one or more machine learning models to select one or more marker treatments to be applied to audio or video before or after the marker in the media program. The marker treatments could include (but are not limited to) an audio fade-in, an audio fade-out, a video fade-in, a video fade-out, or a black slate.

Analysis engine 122 or scoring engine 124 also determine 412 whether scores have been computed for all markers in the media program. While one or more markers lack scores, analysis engine 122 and scoring engine 124 repeat operations 404-408 to determine audio characteristics, video characteristics, or scores for the marker(s).

After audio characteristics, video characteristics, or scores have been generated for all markers, scoring engine 124 generates 414 a ranking of the markers by the scores. For example, scoring engine 124 could rank the markers so that markers with scores that indicate the greatest suitability as insertion points for additional content are at the top of the ranking and markers with scores that indicate the lowest suitability as insertion points for additional content are at the bottom of the ranking.

Finally, scoring engine 124 or another component inserts 416 additional content at one or more markers based on the ranking. For example, scoring engine 124 could select a subset of highest ranked markers or a subset of markers with scores that meet a threshold as insertion points for the additional content. Scoring engine 124 could also update metadata for the media program to include the locations of the selected markers, overall marker scores for the selected markers, marker treatments to be applied to the selected markers, or other information related to the insertion of additional content at the selected markers. A downstream streaming service or playback service could use the metadata to insert commercials or other content at some or all of the selected markers, apply marker treatments to the media program before or after a given marker, or perform other operations related to inserting content into the media program.

In sum, the disclosed techniques assess markers denoting locations in media programs for suitability as insertion points for commercials, previews, promotions, or other additional content. The markers can include video frames corresponding to scene changes, chapter breaks, black slugs, or other types of "transitions" in the media programs. The markers can also, or instead, include frames that are randomly selected from the media programs or regularly spaced within the media programs. One or more intervals of audio or video in proximity to a given marker are analyzed to determine a set of audio characteristics or a set of video characteristics associated with the marker. The audio characteristics include loudness levels, detected speech, longer-arc semantics, or correlation of audio spectrum features in audio occurring before or after the marker. The video characteristics include measurements of scene dispersion, luminance levels, spatial or temporal activity, or semantic characteristics in video occurring before or after the marker.

The audio or video characteristics associated with a marker are combined with a set of rules, a set of weights, one or more formulas, or one or more machine learning models to generate one or more scores representing the suitability of the marker as an insertion point for additional content. A ranking of markers in a media program is also generated and used to select a subset of the most "suitable" markers as insertion points for additional content. The audio or video characteristics are additionally used to determine marker treatments to be applied to the audio or video in the vicinity of each marker to ensure a "smoother" transition between the media program and the content inserted at the marker. The marker treatments can include (but are not limited to) an audio fade-in, an audio fade-out, a video fade-in, a video fade-out, or a black slate.

One technical advantage of the disclosed techniques relative to the prior art is that, with the disclosed techniques, additional content can be inserted automatically at various markers in a media program, where the content of the media program at those markers has been determined to have audio or video characteristics suitable for the inserted content. Accordingly, the disclosed techniques improve the coherence and continuity of viewing experiences associated with media programs that are aired or played with commercial breaks or other inserted content. Another technical advantage of the disclosed techniques is that the suitability of each marker as an insertion point for additional content is determined in a predictable fashion from a wide range of audio or video characteristics. Consequently, the disclosed techniques analyze and identify higher quality or more optimized locations at which content should inserted relative to what can be achieved using prior art techniques. An additional technical advantage of the disclosed techniques is the ability to efficiently identify suitable insertion points for content in media programs, which allows the disclosed techniques to be used in time-sensitive applications such as live productions. These technical advantages provide one or more technological improvements over prior art approaches.

1. In some embodiments, a computer-implemented method for inserting content into a media program comprises determining a plurality of markers corresponding to a plurality of locations within the media program; for each marker included in the plurality of markers, performing one or more operations to automatically analyze a first set of intervals within the media program that lead up to the marker and a second set of intervals within the media program that immediately follow the marker and determine a set of audio characteristics associated with the first set of intervals and the second set of intervals; generating a plurality of scores for the plurality of markers based on the sets of audio characteristics; and inserting additional content at one or more markers included in the plurality of markers based on the plurality of scores.

2. The computer-implemented method of clause 1, further comprising determining one or more marker treatments associated with the one or more markers based on the sets of audio characteristics determined for the one or more markers, wherein the one or more marker treatments comprise at least one of an audio fade-in or an audio fade-out.

3. The computer-implemented method of any of clauses 1-2, wherein generating the plurality of scores comprises computing a score for a first marker included in the plurality of markers based on a first audio characteristic determined for a first interval within the media program that leads up to the first marker and a second audio characteristic determined for a second interval within the media program that immediately follows the first marker.

4. The computer-implemented method of any of clauses 1-3, wherein generating the plurality of scores comprises computing an overall score for a first marker included in the plurality of markers based on a weighted combination of a subset of the plurality of scores determined based on the set of audio characteristics for the first marker.

5. The computer-implemented method of any of clauses 1-4, further comprising generating a ranking for the plurality of markers based on the plurality of scores; and determining the one or more markers based on the ranking.

6. The computer-implemented method of any of clauses 1-5, wherein the set of audio characteristics determined for a first marker included in the plurality of markers comprises at least one of a loudness level or a presence or absence of speech.

7. The computer-implemented method of any of clauses 1-6, wherein the set of audio characteristics determined for a first marker included in the plurality of markers comprises a first set of spectrum characteristics determined for the first set of intervals leading up to the first marker and a second set of spectrum characteristics determined for a second set of intervals immediately following the first marker.

8. The computer-implemented method of any of clauses 1-7, wherein the plurality of scores comprises one or more scores representing one or more similarities between the first set of spectrum characteristics and the second set of spectrum characteristics.

9. The computer-implemented method of any of clauses 1-8, further comprising generating the plurality of scores for the plurality of markers based on a set of video characteristics determined for one or more portions of the media program proximate to each marker included in the plurality of markers.

10. The computer-implemented method of any of clauses 1-9, wherein the set of video characteristics comprises at least one of a luminance level, a measurement of dispersion in scenes, a spatial activity, a temporal activity, or a semantic characteristic.

11. In some embodiments, one or more non-transitory computer-readable media store instructions that, when executed by one or more processors, cause the one or more processors to perform the steps of determining a plurality of markers corresponding to a plurality of locations within a media program; for each marker included in the plurality of markers, performing one or more operations to automatically analyze a first set of intervals within the media program that lead up to the marker and a second set of intervals within the media program that immediately follow the marker and determine a set of audio characteristics associated with the first set of intervals and the second set of intervals; generating a plurality of scores for the plurality of markers based on the sets of audio characteristics; and inserting additional content at one or more markers included in the plurality of markers based on the plurality of scores.

12. The one or more non-transitory computer-readable media of clause 11, wherein generating the plurality of scores comprises inputting the set of audio characteristics for a first marker included in the plurality of markers into a machine learning model; and obtaining one or more scores for the first marker as output of the machine learning model.

13. The one or more non-transitory computer-readable media of any of clauses 11-12, wherein performing one or more operations to automatically analyze the first set of intervals and the second set of intervals comprises determining a first set of spectrum characteristics for a first audio interval leading up to the marker and a second set of spectrum characteristics for a second audio interval immediately following the marker; and computing a set of pairwise similarities between the first set of spectrum characteristics and the second set of spectrum characteristics.

14. The one or more non-transitory computer-readable media of any of clauses 11-13, wherein the first set of spectrum characteristics and the second set of spectrum characteristics are determined based on a window size that is shorter than the first audio interval and the second audio interval.

15. The one or more non-transitory computer-readable media of any of clauses 11-14, wherein generating the plurality of scores comprises computing one or more scores for the marker based on an aggregation of the set of pairwise similarities.

16. The one or more non-transitory computer-readable media of any of clauses 11-15, wherein the first set of spectrum characteristics and the second set of spectrum characteristics comprise at least one of a mel-scale spectrogram, a mel-frequency ceptrum coefficient, or a tempogram.

17. The one or more non-transitory computer-readable media of any of clauses 11-16, wherein the set of audio characteristics determined for a first marker included in the plurality of markers comprises a first loudness level associated with a first audio interval leading up to the first marker, a second loudness level associated with a second audio interval immediately following the first marker, a first detection of speech within a third audio interval leading up to the first marker, and a second detection of speech within a fourth audio interval immediately following the first marker.

18. The one or more non-transitory computer-readable media of any of clauses 11-17, wherein the set of audio characteristics determined for a first marker included in the plurality of markers comprises an indication of semantic continuity across the first marker.

19. The one or more non-transitory computer-readable media of any of clauses 11-18, wherein the instructions further cause the one or more processors to perform the step of generating the plurality of scores for the plurality of markers based on a set of video characteristics determined for one or more portions of the media program proximate to each marker included in the plurality of markers.

20. In some embodiments, a system comprises one or more memories that store instructions, and one or more processors that are coupled to the one or more memories and, when executing the instructions, are configured to perform the steps of determining a plurality of markers corresponding to a plurality of locations within a media program; for each marker included in the plurality of markers, performing one or more operations to automatically analyze a first set of intervals within the media program that lead up to the marker and a second set of intervals within the media program that immediately follow the marker and determine a set of audio characteristics associated with the first set of intervals and the second set of intervals; generating a plurality of scores for the plurality of markers based on the sets of audio characteristics; and inserting additional content at one or more markers included in the plurality of markers based on the plurality of scores.

Any and all combinations of any of the claim elements recited in any of the claims or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations or block diagrams of methods, apparatus (systems) and computer program products according to embodiments of the disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for inserting additional content into a media program, the method comprising:
   determining a plurality of markers corresponding to a plurality of locations within the media program;
   for each marker included in the plurality of markers, performing one or more operations to automatically analyze a first set of intervals within the media program that lead up to the marker and a second set of intervals within the media program that immediately follow the marker and determine a set of characteristics associated with the first set of intervals and the second set of intervals;
   generating a plurality of scores for the plurality of markers based on the sets of characteristics; and
   inserting the additional content at one or more markers included in the plurality of markers based on the plurality of scores;
   wherein generating the plurality of scores comprises computing a score for a first marker included in the plurality of markers based on a first characteristic determined for a first interval within the media program that leads up to the first marker and a second characteristic determined for a second interval within the media program that immediately follows the first marker.

2. The computer-implemented method of claim 1, further comprising determining one or more marker treatments associated with the one or more markers based on the sets of characteristics determined for the one or more markers, wherein the one or more marker treatments comprise at least one of a fade-in or a fade-out.

3. The computer-implemented method of claim 1, wherein generating the plurality of scores comprises computing an overall score for the first marker included in the plurality of markers based on a weighted combination of a subset of the plurality of scores determined based on the set of characteristics for the first marker.

4. The computer-implemented method of claim 1, further comprising:
generating a ranking for the plurality of markers based on the plurality of scores; and
determining the one or more markers based on the ranking.

5. The computer-implemented method of claim 1, wherein the first and second characteristics determined for the first marker included in the plurality of markers comprises at least one of an audio loudness level or a presence or absence of speech.

6. The computer-implemented method of claim 1, wherein the first and second characteristics determined for the first marker included in the plurality of markers comprises a first set of audio spectrum characteristics determined for the first interval leading up to the first marker and a second set of audio spectrum characteristics determined for the second interval immediately following the first marker.

7. The computer-implemented method of claim 6, wherein the plurality of scores comprises one or more scores representing one or more similarities between the first set of audio spectrum characteristics and the second set of audio spectrum characteristics.

8. The computer-implemented method of claim 1, wherein the set of characteristics include a set of video characteristics, and wherein generating the plurality of scores for the plurality of markers is based on the set of video characteristics determined for one or more portions of the media program proximate to each marker included in the plurality of markers.

9. The computer-implemented method of claim 8, wherein the set of video characteristics comprises at least one of a luminance level, a measurement of dispersion in scenes, a spatial activity, a temporal activity, or a semantic characteristic.

10. One or more non-transitory computer-readable media storing instructions that, when executed by one or more processors, cause the one or more processors to perform:
determining a plurality of markers corresponding to a plurality of locations within a media program;
for each marker included in the plurality of markers, performing one or more operations to automatically analyze a first set of intervals within the media program that lead up to the marker and a second set of intervals within the media program that immediately follow the marker and determine a set of characteristics associated with the first set of intervals and the second set of intervals;
generating a plurality of scores for the plurality of markers based on the sets of characteristics; and
inserting additional content at one or more markers included in the plurality of markers based on the plurality of scores;
wherein generating the plurality of scores comprises computing a score for a first marker included in the plurality of markers based on a first characteristic determined for a first interval within the media program that leads up to the first marker and a second characteristic determined for a second interval within the media program that immediately follows the first marker.

11. The one or more non-transitory computer-readable media of claim 10, wherein generating the plurality of scores comprises:
inputting the first and second characteristics for the first marker included in the plurality of markers into a machine learning model; and
wherein computing the score for the first marker is an output of the machine learning model.

12. The one or more non-transitory computer-readable media of claim 10, wherein performing one or more operations to automatically analyze the first set of intervals and the second set of intervals comprises:
determining a first set of audio spectrum characteristics for the first interval leading up to the first marker and a second set of audio spectrum characteristics for the second interval immediately following the first marker; and
computing a set of pairwise similarities between the first set of spectrum characteristics and the second set of spectrum characteristics.

13. The one or more non-transitory computer-readable media of claim 12, wherein the first set of audio spectrum characteristics and the second set of audio spectrum characteristics are determined based on a window size that is shorter than the first interval and the second interval.

14. The one or more non-transitory computer-readable media of claim 12, wherein generating the plurality of scores comprises an aggregation of the set of pairwise similarities.

15. The one or more non-transitory computer-readable media of claim 12, wherein the first set of audio spectrum characteristics and the second set of audio spectrum characteristics comprise at least one of a mel-scale spectrogram, a mel-frequency ceptrum coefficient, or a tempogram.

16. The one or more non-transitory computer-readable media of claim 10, wherein the first and second characteristics determined for the first marker included in the plurality of markers comprises a first audio loudness level associated with the first interval leading up to the first marker, a second audio loudness level associated with the second interval immediately following the first marker, a first detection of speech within a third interval leading up to the first marker, and a second detection of speech within a fourth interval immediately following the first marker.

17. The one or more non-transitory computer-readable media of claim 10, wherein the first and second characteristics determined for the first marker included in the plurality of markers comprises an indication of semantic continuity across the first marker.

18. The one or more non-transitory computer-readable media of claim 10, wherein the set of characteristics include a set of video characteristics, and wherein the generating the plurality of scores for the plurality of markers is based on the set of video characteristics determined for one or more portions of the media program proximate to each marker included in the plurality of markers.

19. One or more non-transitory computer-readable media storing instructions that, when executed by one or more processors, cause the one or more processors to perform:
  determining a plurality of markers corresponding to a plurality of locations within a media program;
  for each marker included in the plurality of markers, performing one or more operations to automatically analyze a first set of intervals within the media program that lead up to the marker and a second set of intervals within the media program that immediately follow the marker and determine a set of characteristics associated with the first set of intervals and the second set of intervals;
  generating a plurality of scores for the plurality of markers based on the sets of characteristics; and
  inserting additional content at one or more markers included in the plurality of markers based on the plurality of scores;
  wherein generating the plurality of scores comprises:
    inputting the first and second characteristics for the first marker included in the plurality of markers into a machine learning model; and
    obtaining the scores as an output of the machine learning model.

20. One or more non-transitory computer-readable media storing instructions that, when executed by one or more processors, cause the one or more processors to perform:
  determining a plurality of markers corresponding to a plurality of locations within a media program;
  for each marker included in the plurality of markers, performing one or more operations to automatically analyze a first set of intervals within the media program that lead up to the marker and a second set of intervals within the media program that immediately follow the marker and determine a set of characteristics associated with the first set of intervals and the second set of intervals;
  generating a plurality of scores for the plurality of markers based on the sets of characteristics; and
  inserting additional content at one or more markers included in the plurality of markers based on the plurality of scores;
  wherein the first and second characteristics determined for a first marker included in the plurality of markers comprises a first audio loudness level associated with the first interval leading up to the first marker, a second audio loudness level associated with the second interval immediately following the first marker, a first detection of speech within a third interval leading up to the first marker, and a second detection of speech within a fourth interval immediately following the first marker.

* * * * *